R. MARSLAND.
SUPPORTING BEARING.
APPLICATION FILED DEC. 31, 1920.

1,429,606.

Patented Sept. 19, 1922.
2 SHEETS—SHEET 1.

Roland Marsland
INVENTOR

BY O C Davis
ATTORNEY

Patented Sept. 19, 1922.

1,429,606

UNITED STATES PATENT OFFICE.

ROLAND MARSLAND, OF ESSINGTON, PENNSYLVANIA, ASSIGNOR TO WESTINGHOUSE ELECTRIC AND MANUFACTURING COMPANY, A CORPORATION OF PENNSYLVANIA.

SUPPORTING BEARING.

Application filed December 31, 1920. Serial No. 434,259.

*To all whom it may concern:*

Be it known that I, ROLAND MARSLAND, a citizen of the United States, and a resident of Essington, in the county of Delaware and State of Pennsylvania, have invented a new and useful Improvement in Supporting Bearings, of which the following is a specification.

My invention relates to supporting bearings for rotatable elements and has for its object to provide apparatus of the character designated in which supporting rollers shall automatically move to bring the axes into parallelism with the axis of the rotatable element upon any deviation or misalignment of the rotatable element axis.

In balancing machines, some difficulty has been encountered with the supporting bearings for the element which is to be balanced. In a device of this kind, the bearings should be of such a type that the element to be balanced may be readily removed from and placed upon the rollers; and, consequently, a pair of rollers journaled in supporting frames for supporting the rotary element to be balanced offers a very simple arrangement. However, with a pair of supporting rollers, such as referred to, it is desirable that the axes of the rotary element and of the supporting rollers should be maintained in parallelism in order to avoid skewing of the rollers and wearing of the journal, thereby rendering difficult the operation of balancing, and it is therefore necessary to mount each of the supporting rollers in a frame which is capable of motion about axes substantially and mutually perpendicular to the axis of rotation of the roller. In other words, each of the rollers should have three degrees of freedom in operation.

A supporting roller, with three degrees of freedom, such as referred to, without a special arrangement of the axes, would, in many cases, be practically inoperative on account of a tendency of the roller to become askew and inability of the roller to automatically and expeditiously right itself with reference to the axis of the rotary element. Accordingly, I pivot the supporting frame for each of the rollers behind the roller, considering the direction of rotation of the rotary element. Such an arrangement obviously gives to the roller the automatic righting effect and thereby renders possible the rotation of the element to be balanced with assurance that the axes of the supporting rollers will be maintained in parallelism therewith, regardless of any deviation or misalignment of the axes.

Apparatus embodying features of my invention is illustrated in the accompanying drawings forming a part of this application, in which, Fig. 1 is an elevational view of a balancing machine with the casing shown in section, having my improvement applied thereto;

Figure 1:
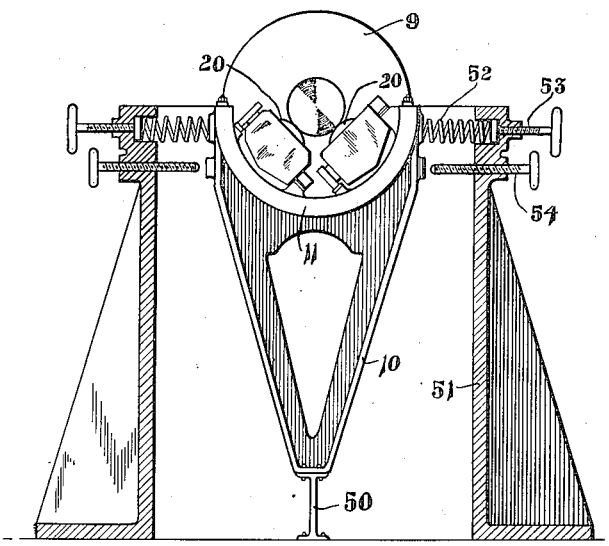
Figure 3:
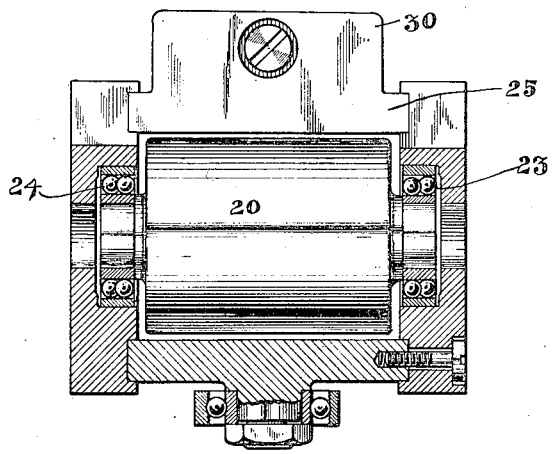
Fig. 3 is a detail view of a supporting roller mechanism.

In the drawings, a rotary element 9, such for example, as an element to be balanced, is supported by a bearing and the latter is carried by the pendulum frame 10, of a balancing machine.

The supporting bearing comprises an arcuate supporting element 11, preferably channel-shapped in cross section, which is supported by the portion 12 of the frame. As shown in the drawings, the supporting element 11 is symmetrical in design and is provided medially thereof with a dowel pin 15 fitting within opening 14 of the pendulum frame. Owing to the symmetry of design of the supporting element 11, it is obvious that the element may be removed and reversed, which is desirable with a bearing of applicant's type, when the direction of the rotation of the element to be balanced is reversed. The supporting element 11 is maintained in position with reference to the frame 10 by means of bars 16, bridging across the ends of the supporting element and portions of the frame, and the screw means 17 carried by the frame for clamping the bars against the ends of the supporting element.

Figure 2:
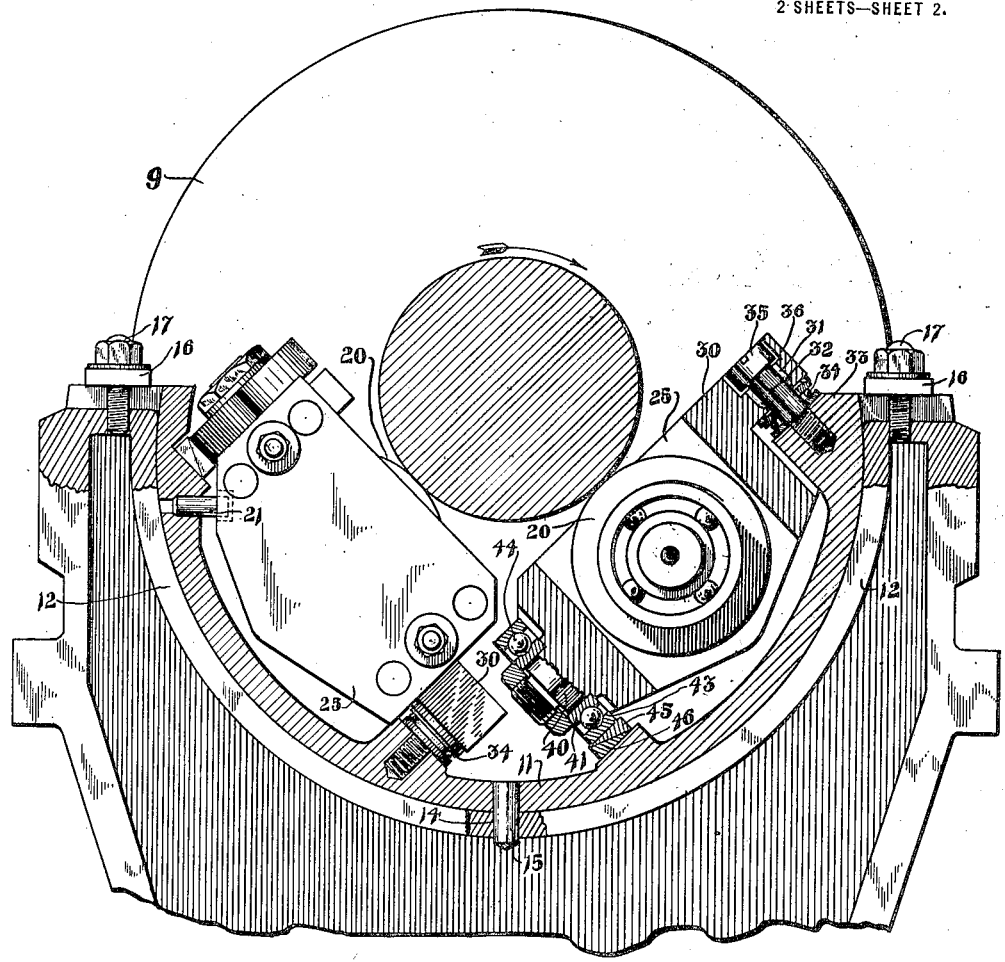
Fig. 2 is a detail sectional and elevational view of the bearing.

As shown in Figures 1 and 2, I have provided two supporting rollers 20 for supporting the rotary element 9. Each of the rollers is journaled in a frame and the latter is adapted to be pivoted about an axis substantially parallel to the radius of the rotary element passing through the point of contact thereof with the roller and behind the roller, considering the direction of rotation of the rotatable element 9. With the element 9 rotating in a clock-wise direction, as shown in Fig. 1, the right-hand roller is normally stable whereas the left-hand roller is unstable. Accordingly, I have provided a pin and slot connection 21 for the left-hand roller, allowing necessary freedom thereof in operation. Otherwise, the two supporting rollers are structurally the same and a detailed description of one will suffice.

Each supporting roller 20 is journaled by means of ball bearings 23 and 24 in the roller supporting frame or cradle 25 comprising side and end pieces secured together. One end piece is provided with rearward extensions 30 having an opening 31 surrounding the pivot 32 secured to a projection 33 carried by the supporting element 11. A roller thrust bearing 34 of a well-known type is arranged between the extension 30 and the supporting projection 33. Universal or tilting movement is provided for between the top raceway and the cradle extension, as may be seen from the drawings, wherein the top raceway of the thrust bearing is shown provided with a spherical surface cooperating with a ring arranged between it and the extension 30 which is provided with a conjugate spherical surface, thereby allowing for rocking motion between the two rings. The opening 31 in the extension 30 is slightly larger than the pin 32, whereby a limited amount of tilting motion of the frame with reference to the pin is allowed. As shown, the pin is provided with a head 35 which fits freely within a countersunk opening 36 in the extension, thereby maintaining the roller frame in position and at the same time allowing for the tilting motion referred to.

The other end member of the roller supporting frame or cradle is provided with a trunnion 40 upon which is firmly secured the inner raceway 41 of a roller bearing. The outer raceway 43 is shown as surrounding the balls 44 interposed between the raceways and serves as a roller for supporting one end of the roller frame or cradle when the latter oscillates about the axis of the pin 32.

A bearing trackway is provided for the outer raceway which is made up of two wedge-shaped sections 45 and 46 which may be moved relatively to secure an adjustable trackway. Any suitable means may be used to secure the parts 45 and 46 in position relatively to the supporting element 11.

Figure 4:
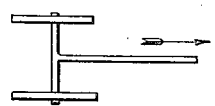
Figs. 4 and 5 are diagrammatic views to indicate the principle of the invention involved.
Figure 5:
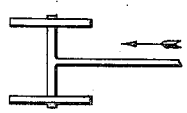

The operation of my bearing is made clearer by reference to diagrammatic Figures 4 and 5. Fig. 4 diagrammatically represents a two-wheel cart which is moved by application of a pulling force to the end of the tongue, whereas Fig. 5 is a diagrammatic view in which a pushing force is applied to the end of the tongue. It will be obvious that, in the second instance, it is more difficult to guide the cart than in the first instance for the reason that, in the second instance, the object moved is in an unstable state with reference to the point of application of the force, whereas, in the first case, the load moved is stably located with reference to the point of application of the force. This principle has been incorporated in my bearing. In other words, upon reference to Figures 1 and 2, it will be seen that each of the supporting rollers is journaled in a cradle or frame and that the latter is pivoted about an axis rearwardly of the roller, considering the direction of rotation of the rotatable element 9. The pivoting of the roller supporting frame or cradle about its axis allows for the required degree of motion thereabout. Motion of the roller about a longitudinal axis is permitted by the spherically seated rings of the thrust bearing and the roller of the roller bearing roller 43. It will thus be seen that the roller supporting frame or cradle has two degrees of freedom, one, about an axis substantially parallel to the radius of the rotary element passing through the point of contact thereof with the supporting roller and in the rear of the supporting roller, considering the direction of rotation of the rotary element, and the other, an axis which intersects the roller axis and is substantially parallel to the tangent at the point of contact of the rotary element and the supporting roller. It will thus be seen that each roller has three degrees of freedom, namely, its axis of rotation and two axes in mutually perpendicular planes. Due to the fact that the pivot axes are in the rear of the rollers, considering the direction of rotation of the rotary element 9, it will be obvious that the extensions 30 will be in tension, which corresponds to the condition existing in diagrammatic view, Fig. 4, and accordingly, if there should be any inaccuracies or deviation of the axis of the rotary element 9 from a given axial position, then the rollers may move about the two transverse axes referred to in order to automatically correct for misalignment or deviation. In other words, my roller may be termed a "tractor roller," one which at all times traverses a path of pursuit, that is, its axis is at all times normal to its path, or, expressed in another way, a plane normal to the roller passes through the axis of support.

When it is desired to rotate the element 9 in the opposite direction, it is necessary that the rollers be reversed. This is easily accomplished by unscrewing the elements 17, removing the clamping bars 16, removing the supporting element 11, turning the latter 180° and replacing it on the frame, and owing to the symmetry of design of the supporting element 11, the medial position of the dowel pin 15 and the cooperating tapered opening 14, the supporting element may be easily and correctly placed in position.

Fig. 1 shows the application of my invention to a balancing machine comprising a pendulum frame 10 supported by an I-beam member 50. The balancing machine has a rigid frame 51 and the latter is provided on each side with supporting coil springs 52 whose tension may be varied by means of the screws 53. Screws 54 are shown for maintaining the pendulum frame in a fixed position, especially when starting.

Although I have shown my invention applied to a balancing machine, it will be obvious that it may be applied wherever its use is desirable.

From the foregoing, it will be seen that I have provided a relatively simple support bearing of the anti-friction type which is capable of automatic adjustment so as to maintain the axes of the rollers thereof in a state of parallelism with the axis of the element supported upon deviation of the axis of the latter from a given position, thereby resulting in a smooth running bearing.

While I have shown my invention in but one form it will be obvious to those skilled in the art that it is not so limited but is susceptible of various other changes and modifications, without departing from the spirit thereof and I desire, therefore, that only such limitations shall be placed thereupon as are imposed by the prior art or as are specifically set forth in the appended claims.

What I claim is:

1. A supporting bearing for a rotatable element comprising a plurality of rollers, supporting frames for the rollers, and pivot means for the frames arranged behind the rollers and with their axes transverse to the roller axes, considering the direction of rotation of the rotatable element.

2. In a bearing for a rotatable element, the combination of supporting roller mechanism comprising a roller, a frame in which the roller is journaled, and pivot means for the frame arranged behind the roller and with its axis transverse to the roller axis, considering the direction of rotation of the rotatable element.

3. A bearing for a rotatable element comprising a plurality of tractor rollers each of which comprises a roller and a frame oscillatable about an axis which is transverse of the roller axis and to the rear of the place of contact of said roller and element.

4. A bearing for supporting a rotatable element comprising a pair of supporting rollers, a frame for each roller, a pivot for each frame whose axis is transverse and to the rear of the roller axis so that the portion of the frame between the roller and the pivot is in tension when the supported element is rotating.

5. A bearing for a rotatable element comprising a plurality of rollers contacting with the element, cradles for the rollers, a pivotal connection for each cradle whose axis is transverse to its roller axis and to the rear of the place of contact of its roller with the element considering the direction of motion of the roller and element at the place of contact, and a supporting roller for each cradle at the end thereof opposite to its pivotal connection, whereby each cradle may oscillate about its pivot when a righting effect is being exerted on its roller.

6. A bearing for a rotatable element comprising a pair of rollers adapted to contact with the element and frames for the rollers pivotally supported about axes which are transverse of the respective roller axes and rearwardly of the places of contact of said rollers and element considering the direction of motion at the places of contact.

7. A supporting bearing for a rotatable element comprising a plurality of rollers, supporting frames for the rollers, pivot means for each frame arranged behind its roller, considering the direction of rotation of the rotatable element, whereby the roller and frame may move about an axis substantially parallel to the radius of the rotatable element passing through the point of contact thereof with the roller, and means whereby the frame may rock about a longitudinal axis normal to the roller axis, the two motions of the frame contributing to correct for misalignment.

8. A supporting bearing for a rotatable element including a supporting roller, a frame for the roller, and pivot means for the frame whereby the latter has freedom of motion about two substantially perpendicular axes in a plane substantially normal to the roller axis and intersecting behind the roller axis, considering the direction of rotation of the rotatable element.

9. A supporting bearing for a rotatable element including a supporting roller, a frame for the roller, a pivot pin for the frame arranged behind the roller, considering the direction of rotation of the rotatable element, a universal bearing connection between the frame and the pivot pin, and a roller for the opposite end of the frame whereby the frame may oscillate about the pivot pin and rock about a transverse axis.

10. A supporting bearing for a rotatable element including a supporting roller, a frame or cradle for the roller, a pivot pin for the frame arranged behind the roller, considering the direction of rotation of the rotatable element, a universal thrust bearing between the frame and the pivot pin, and a roller bearing supporting roller for the opposite end of the frame whereby the frame may oscillate about the pivot pin and rock about a transverse axis.

11. A supporting bearing for a rotatable element including a machine frame, a bearing support carried by the machine frame, means whereby the bearing support element may be secured in position with reference to the machine frame, a plurality of supporting rollers for the rotatable element, frames or cradles for the rollers, universal pivot means for the frame or cradle members arranged rearwardly of the rollers considering the direction of rotation of the rotatable element and carried by the bearing support, and anti-friction supporting rollers for the ends of the frames or cradles opposite to the pivot means adapted to roll on the bearing support.

12. A supporting bearing for a rotatable element including a supporting element adapted for reversible connection with a machine frame, one or more supporting rollers for the rotatable element, a cradle or frame for each of the rollers, universal pivot means carried by the supporting element for each cradle or frame arranged rearwardly of the roller, considering the direction of rotation of the rotatable element, and an anti-friction supporting roller for the end of each frame opposite to its pivot means, and an adjustable trackway secured to the supporting element for the anti-friction element.

13. A supporting bearing for a rotatable element comprising a plurality of rollers, supporting frames for the rollers and pivot means for each frame arranged behind its roller, considering the direction of rotation of the roller and the element at the place of contact thereof, whereby each frame and its roller may move about an axis substantially parallel to the radius of the rotatable element passing through said place of contact.

In testimony whereof, I have hereunto subscribed my name this 28th day of December, 1920.

ROLAND MARSLAND.